United States Patent

Paulson

[15] 3,698,845
[45] Oct. 17, 1972

[54] PLASTICS INJECTION-MOLDING MACHINE UTILIZING PREMIXED BILLETS

[72] Inventor: Donald C. Paulson, Southington, Conn.

[73] Assignee: The New Britain Machine Company, New Britain, Conn.

[22] Filed: Oct. 22, 1969

[21] Appl. No.: 868,303

[52] U.S. Cl. ................. 425/145, 425/166, 425/244, 100/245
[51] Int. Cl. ............................................. B29c 3/04
[58] Field of Search .18/30 FJ, 30 FN, 30 FQ, 30 FP, 18/30 FM, 30 FH, 30 FG, 30 CM, 30 CK, 30 CR, 30 CS, 30 CV; 425/145, 148

[56] References Cited

UNITED STATES PATENTS

| | | | |
|---|---|---|---|
| 2,477,258 | 7/1949 | MacMillin | 18/30 FS |
| 2,568,332 | 9/1951 | Genovese | 18/30 FH |

FOREIGN PATENTS OR APPLICATIONS

| | | | |
|---|---|---|---|
| 723,536 | 8/1942 | Germany | 18/30 FQ |

Primary Examiner—J. Spencer Overholser
Assistant Examiner—Lucius R. Frye
Attorney—Robert S. Smith, David S. Urey, Alan C. Rose and Alfred B. Levine

[57] ABSTRACT

The disclosure contemplates the selective supplying of a premixed plastic article of a predetermined composition into the plasticizing or melt-producing section of a plastics injection-molding machine. Means are provided to sense the presence of a minimum amount of the article necessary to produce a predetermined quantity of melt for use in the machine and to then deliver a new premixed article into operative engagement with the plasticizing section of the machine; such delivery is so synchronized with the machine cycle as to assure that plasticizing and mold-injection phases will not be curtailed or impaired to further assure that if there is a delivery failure, the shutdown of the machine will not occur during either the plasticizing or the mold-injection phase.

18 Claims, 7 Drawing Figures

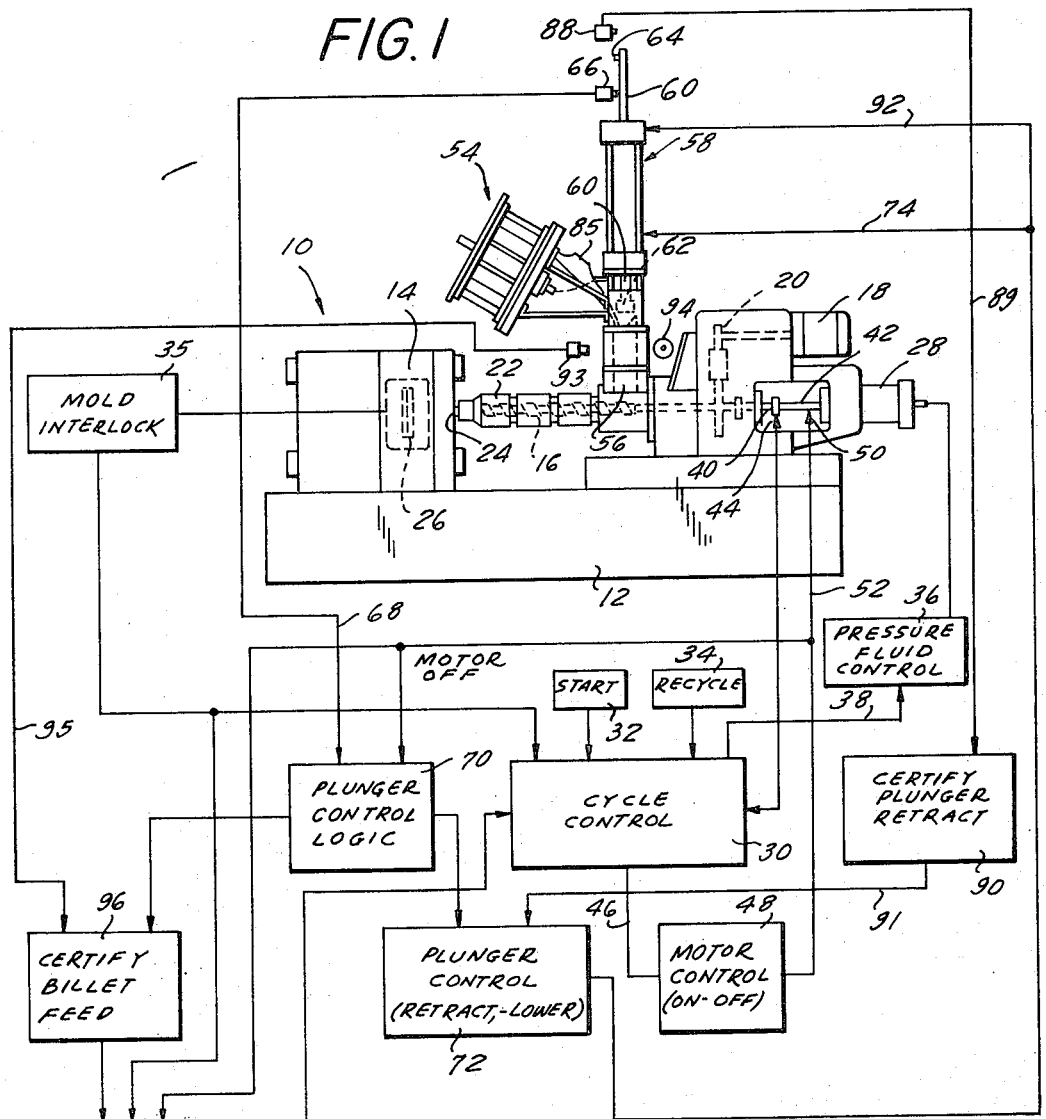
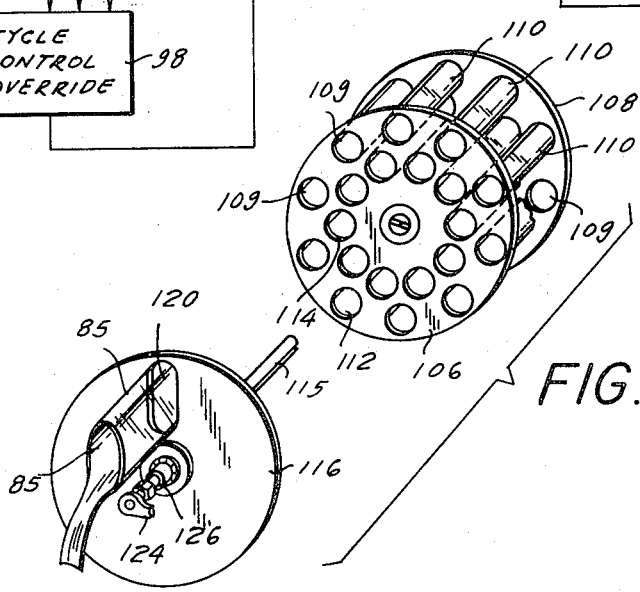

INVENTOR
DONALD C. PAULSON
BY
Sandoe, Hopgood & Calimafde
ATTORNEYS

PLASTICS INJECTION-MOLDING MACHINE UTILIZING PREMIXED BILLETS

The present invention relates to plastics injection-molding machines, and in particular to a machine of this type to which preformed articles having a known composition are introduced for purposes of forming a plasticized melt.

Plastics injection-molding machines are commonly used for the production and fabrication of articles made of plastic. In the operation of certain of these machines, a quantity of plastic material, generally in the form of plastic shavings, chips or the like, is introduced into a hopper for gravity-feed into a barrel in which an elongated plasticizing screw is rotatably positioned. The screw operates on the plastic material to form a charge of a plasticized melt which is thereafter advanced by the screw for injection discharge through a sprue hole into a mold cavity. Upon the completion of a molding operation, the cured product is removed from the mold, and the operation is repeated by the formation and introduction of a new quantity of plasticized melt into the mold.

For many plastics molding operations, the consistency and quality of the finished plastic product is not particularly critical, and any one of a large variety of plastic materials may be introduced into the plasticizing section of the machine for purposes of forming the melt. However, for many molding operations, the composition, color, resiliency, hardness and/or other design criteria of the finished product must be accurately controlled. For such molding operations as well as those molding operations in which consistency of the finished product is essential, it becomes necessary to utilize plastic material having a known and controlled composition to form the melt. Moreover, in many plastics molding operation, it may be desirable to periodically alter one or more of the characteristics of the finished molded product, such as color, so that it is necessary to periodically vary the input plastic material in accord with the desired properties of the finished product. For such molding operations, the use of plastic shavings having an indeterminate and inconstant composition as the source of the plasticizing melt is clearly not satisfactory.

To achieve the desired control over the quality and consistency of the finished plastic molded product, it is proposed to introduce premixed plastic articles into the plasticizing section of the machine. These articles, or billets, have a predetermined plastic composition corresponding to the desired physical properties of the product.

In the use of such premixed billets in a machine of the character indicated, there is a need for means for properly and reliably feeding the billets into the plasticizing section of the molding machine, while at the same time ensuring proper and reliable operation of the plasticizing, injection and curing phases of machine operation. Stated in other words, these phases of a machine cycle should not be interrupted or otherwise affected by operation of billet-supply mechanism.

It is, accordingly, an object of the present invention to provide an improved plastic injection-molding machine which is particularly well suited for use with premixed plastic billets or the like.

It is a further object of the present invention to provide a machine of the type described in which a sufficient quantity of plastic material supplied to the machine for the purpose of forming a plasticized melt is automatically ensured.

It is another object of the present invention to provide, in a machine of the type described, means for supplying premixed plastic billets in an automatic manner which ensures a consistently adequate amount of material for purposes of making a sufficient quantity of plasticized melt for molding a plastic product.

It is yet another object of the present invention to provide apparatus for supplying premixed plastic billets into the plasticizing section of an injection-molding machine, which can be readily adapted to operate with existing machines of this type, and which can be varied to operate with machines supplying varying amounts of plasticized melt.

A still further object is to meet the foregoing objects with a machine which requires no interruption or lengthening of the normal machine cycle.

To these ends, the present invention provides means for supplying to the plasticizing section of an injection-molding machine, a premixed billet from which a plasticized melt is formed. That billet is masticated by a reciprocating screw to form a predetermined quantity of plasticized melt necessary for forming a finished product in the mold. Means are provided to sense the presence of a minimum amount of remaining billet material in engagement with the plasticizing screw, and upon that sensing to deliver a new billet into the plasticizing section of the machine, thereby to ensure a sufficient amount of plasticizing material for each cycle of machine operation.

The billet-feeding operation is coordinated with the machine's normal plasticizing and injection cycle to allow a new billet to be delivered only when the plasticizing screw is de-energized and away from its melt-injecting position. Thus, the billet-delivery operation does not impair or lengthen the normal plasticizing, injection and curing cycle of the machine.

Means may be provided to sense the failure of a billet delivery when required, and to thereupon (except during the plasticizing, or mold-injection phase or curing phase of the machine cycle) shut down the machine. This permits either a correction of the billet-delivery mechanism or the provision of a new supply of billets, whichever is required.

In the embodiment herein described, the billet is urged into engagement with the plasticizing screw by means of a plunger which is movable between first and second operative positions, the first position being the position in which it is effective to operatively cause engagement between the billet and the plasticizing screw. Upon the sensing of a minimum amount of billet material, and upon also sensing that the machine is in neither the plasticizing nor the injection phase of its operation, the plunger is caused to be raised away from the billet toward its second position, and a new billet is caused to be delivered to the plasticizing section of the machine. The latter operation may be fully accomplished during the mold-opening and mold-clamp phases of the machine cycle, so that no lengthening of the overall machine cycle need be involved.

As herein disclosed, the means for sensing a minimum amount of remaining billet material may comprise means for sensing the relative vertical position of the plunger with respect to a reference point. That is, when the plunger has reached a "minimum" downward position with respect to the remaining billet material, an indication is provided that the quantity of remaining billet material is at its minimum permissible level.

The billet-delivery mechanism as herein described may comprise a magazine formed of at least one apertured plate carrying a plurality of billet-carrying tubes, the end of each tube communicating with one of the apertures formed in that plate. The magazine is incrementally indexed or movable to positions in which successive billet tubes are caused to register with an opening in a fixed plate; in turn, the fixed opening (or billet inlet) communicates with the plasticizing section of the molding machine. Each time the plunger is removed from its billet-engaging position upon the sensing of a minimum amount of billet material, the billet-feed mechanism is indexed to cause it to move to a new position wherein a billet tube is brought into operative communication with the billet inlet. This, as stated above, then causes a new billet to be introduced into the molding machine.

To the accomplishment of the above and to such other objects as may hereinafter appear, the present invention relates to a plastics injection-molding machine utilizing premixed billets as defined in the appended claims and as described in the following specification, taken in conjunction with the accompanying drawings, in which:

FIG. 1 is a simplified schematic diagram of a plastics injection-molding machine incorporating automatic plastic-billet-feed means of the invention;

FIG. 3 is a simplified exploded perspective view of fixed and movable parts of the billet magazine of the mechanism of FIG. 2.

Figure 2:
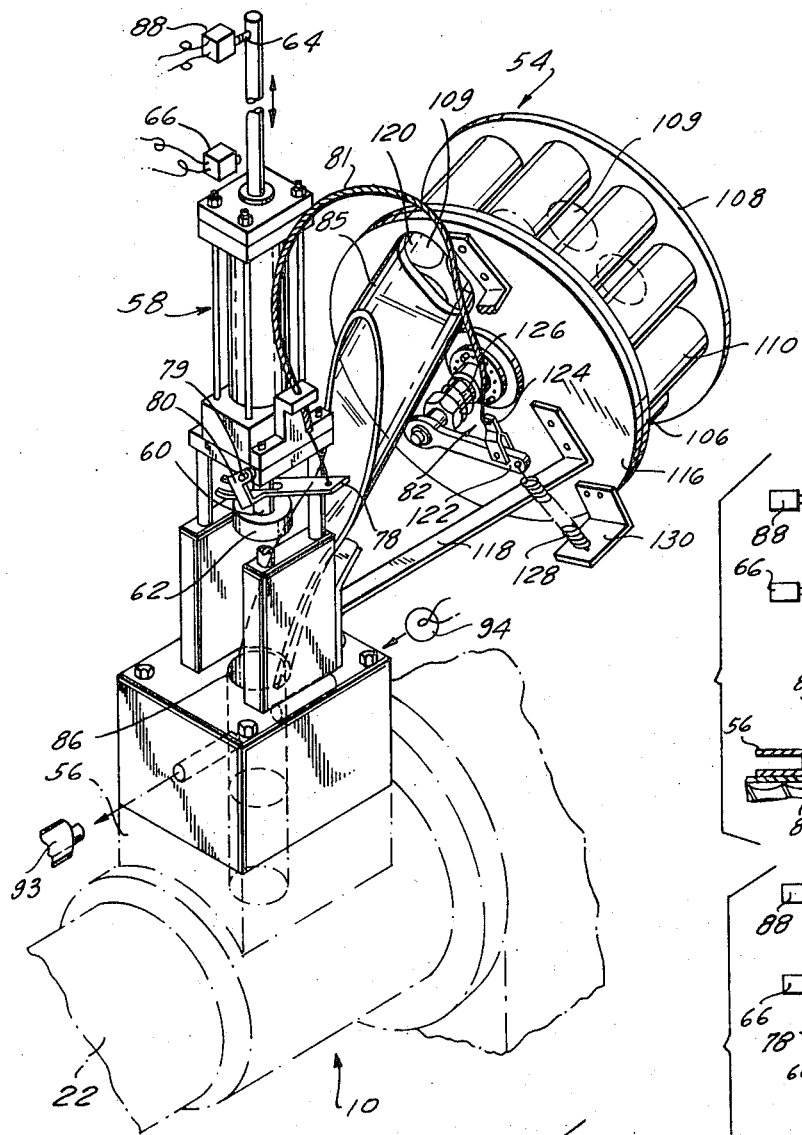
FIG. 2 is a perspective view, on an enlarged scale, of the billet-feeding apparatus of FIG. 1.

Briefly stated, the present invention provides an apparatus for periodically supplying premixed plastic articles or billets into the plasticizing section of a plastics injection-molding machine. The supply of the new billet is initiated by the sensing of a predetermined minimum amount of remaining billet material in operative engagement with the plasticizing section of the molding machine. Upon this sensing, a new billet is positioned for operative engagement with the plasticizing section. The billet-feed operation, when required, occurs within the normal cycling operation of the machine, and does not interfere with either the plasticizing or melt-injection phases of the machine.

Referring to FIG. 1 of the drawings, the invention is shown in application to a plastics injection-molding machine of the reciprocating-screw variety, generally designated 10, and having an elongated bed or frame 12. Frame 12 supports a mold-clamp mechanism 14 at one end and plasticizing and injection mechanism at its other end. The material to be plasticized or formed into a melt is placed in engagement with the rearward part of an elongated plasticizing screw 16 which is rotated by a motor 18 having a geared connection, schematically indicated at 20, with screw 16. The direction of rotation of screw 16 within its confining barrel 22 is such as to accomplish a plasticizing action on the input plastic material while advancing the same toward the front or nozzle end of barrel 22. A nozzle 24 is located at the front end of barrel 22 and is in communicative engagement with the sprue hole or inlet port of a mold 26, secured by the clamp mechanism 14.

As is conventional in molding machines of this type, screw 16 is reciprocable on its axis and is forwardly loaded by a hydraulically operated mechanism 28. The plasticized melt formed by the operation of the screw 16 upon the input plastic material is accumulated forward of the screw and forces the retraction of screw 16 until a sufficient supply of plasticized melt has been prepared for purposes of forming a finished plastic product in mold 26. At the time, motor 18 is de-energized, and upon the clearing of the previously molded or finished product from mold 26, hydraulic mechanism 28 acts on the screw 16 to cause the front end of the screw to act as a ram to inject a new "shot" of plasticized melt into mold 26. Ram pressure is maintained, with screw 16 in its forward position, as long as necessary to permit the setting and curing of the molded product in mold 26.

While the screw is still in its forward position, the plasticizing process is commenced for the next "shot", by restarting the motor 18, and the hydraulic pressure at 28 provides back pressure to "load" the retreat of the screw as the new melt is accumulated.

The control mechanism for operating the various sections of the molding machine 10 is conventional and is shown only schematically in FIG. 1 for purposes of simplicity. Briefly, the cycle control 30 includes a provision at 32 for manual start and at 34 for automatically recycled operation. The recycle operation 34 is to be understood to include various safety interlocks (indicated generally at 35) which certify certain factors of machine operation, such as proper resetting of the clamp mechanism 14 upon removal of the previously cured product from mold 26.

As described above, screw 16, upon the preparation of a suitable amount of plasticized melt, is caused to discharge a shot of the melt through the nozzle 24 into mold 26. At this time, hydraulic control mechanism 28 receives a supply of pressure fluid from a suitable fluid control means 36, as governed by a control connection 38 from the cycle control 30. When screw 16 has reached the foreward position, having just introduced a quantity of melt into mold 26, a lug 40 carried by a piston rod 42 of hydraulic control mechanism 28 contacts a stationary switch 44 to initiate in the cycle control 30 a timed dwell for maintaining a strong hydraulic feed pressure at hydraulic mechanism 28, thus assuring that product-curing will proceed at a sufficient pressure level. When the dwell has been timed-out, cycle control 30 is operative through line 38 to establish a substantially reduced pressure at hydraulic mechanism 28, and through line 46 to operate a motor control 48 for restarting motor 18.

At this time, a new charge of melt is generated, and screw 16 is caused to return to its rearward position. The rear position may be signalled by the timed run of motor 18; however, in the form shown, lug 40 contacts a second limit switch 50, connected to motor control 48 by a line 52. This causes motor 18 to be de-energized, and the clamp mechanism 14 is opened to permit removal of the molded and cured product from mold 26.

The present invention provides means for feeding, in a controlled and automatic manner, a supply of premixed plastic material into operative engagement with the plasticizing section of machine 10. The input plastic material is preferably in the form of premixed and preformed cylindrical billets which have a known, substantially unvarying composition and substantially similar configuration. The billets are held in engagement with the rotating plasticizing screw 16 which forms from the billet a quantity of plasticized melt. That melt subsequently is injected into mold 26 where the finished product is cured and then removed.

In the particular embodiment shown, a plurality of billets is stored in a magazine 54, which, when indexed in a manner to be described below, feeds a single billet into a billet housing 56, the lower end of which communicates with the rearward end of screw 16. The billet is held in engagement with the screw by means of a plunger assembly generally indicated as 58; in this assembly, a plunger 60 is movable, as by hydraulic means (not shown), between a first or lower position, in which it engages the upper end of the billet to urge it downwardly into engagement with screw 16; and a second or retracted position, in which plunger 60 is positioned away from the billet. When there is an insufficient remaining amount of a billet in engagement with screw 16, from which a sufficient quantity of melt cannot be produced by screw 16 for forming another finished product, plunger 60 is caused to be retracted and magazine 54 is incrementally moved to a new billet-delivering position.

The billet-delivering operation is synchronized with the conventional operating cycle of the molding machine in a manner such that delivery of a new billet, after the sensing of a minimum amount of remaining billet, is effected only when motor 16 is de-energized and is not in position for injecting melt into mold 26.

After a new billet is delivered into the machine from magazine 54, plunger 60 is returned to its first position to urge the remaining amount of the original billet, along with the newly-introduced billet, into engagement with screw 16 and the normal plasticizing process is thereupon re-initiated.

Figure 4:
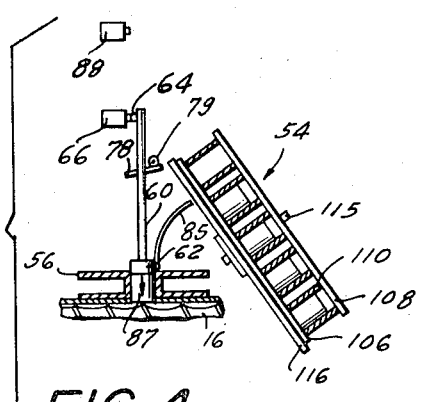

The means for sensing the minimum amount of billet material may comprise means for sensing when the lower end or head 62 of plunger 60 reaches a predetermined lowermost position. Since the volume of remaining billet is directly proportional to its vertical height, the lowermost position of plunger 60 thus provides an accurate indication of a mini-mum amount of billet in engagement with the plasticizing screw. To this end, the motion of plunger head 62 is tracked by a lug 64 which, when head 62 is in its lowermost position (FIG. 4), contacts a position sensor such as a microswitch 66 connected by a line 68 (FIG. 1) to a plunger control circuit 70.

Figure 5:
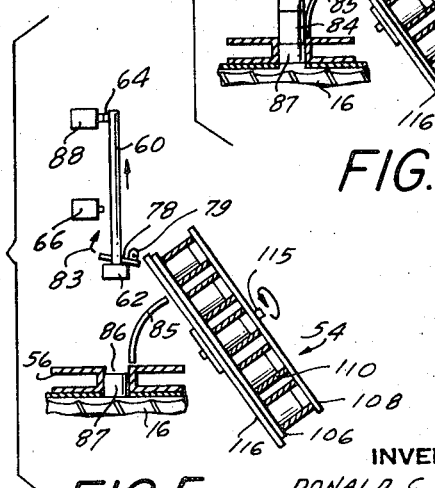

Circuit 70 also received an input from limit switch 50. Upon the operative coincidence of the two input signals to circuit 70, indicating a minimum amount of remaining billet and that screw 16 is in its rearward, non-injecting position and is not rotating, a signal is produced by circuit 70. The signal from circuit 70 is applied to a plunger control 72 which, in response causes a hydraulic system (not shown) to be active through a hydraulic line 74 to raise plunger 60 to its second operative position (FIG. 5).

Figure 6:
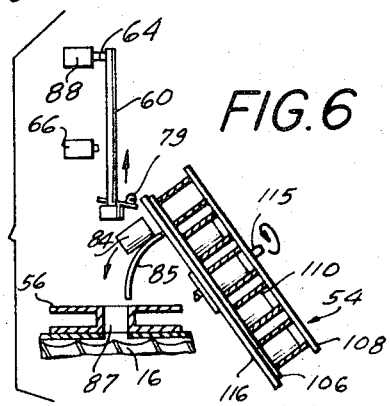
FIGS. 4 to 7 are like schematic sectional views to show a succession of events through which the premixed plastic article is selectively supplied to the plasticizing section of an injection-molding machine in accordance with the present invention.
Figure 7:
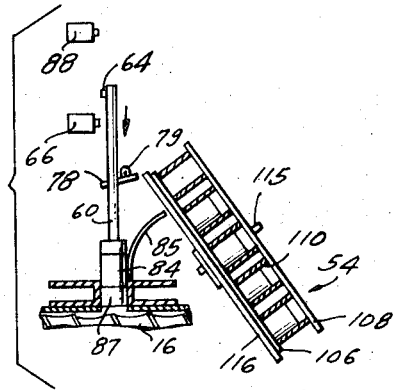

As plunger 60 moves toward its second position, head 62 engages an arm 78 (FIGS. 2 and 5) pivotally mounted on a pin 79 on assembly 58 as by a yoke 80. Arm 78 is mechanically linked via a flexible cable 81 to an indexing mechanism generally designated 82. The engagement of arm 78 by head 62 causes the arm to pivot in the direction of the arrow 83 in FIG. 5, thereby to operate mechanism 82 and thus incrementally rotate magazine 54. This in turn causes a new billet 84 (FIG. 6) to be gravity-fed from magazine 54 into the upper end of a plastic billet feed or guide 85, the lower end of which communicates with an opening 86 at the upper end of billet housing 56. Billet 84 slides down guide 85 through opening 86 and into housing 56, where it comes to rest on the remaining amount of previously supplied billet 87 (FIG. 7).

At about the same time or shortly thereafter, lug 64 contacts a second plunger-position sensor in the form of a microswitch 88 (FIG. 6) positioned vertically above the first microswitch 66, thereby to feed a signal by a line 89 to a plunger retract-certifying circuit 90. Circuit 90 is connected by a line 91 to the plunger control 72 to cause, when switch 88 is thus actuated, the hydraulic system to be active through hydraulic line 89 to return plunger 60 downward to its first operative position (FIG. 7). Plunger 60 and magazine 54 remain stationary so long as a sufficient amount of billet material remains in housing 56, after when the process described above is repeated upon the next sensing of a minimum remaining amount of billet.

From the foregoing, it will be appreciated that the delivery of a new billet into the plasticizing section of the molding machine upon the sensing of a minimum remaining amount of billet material is achieved without impairing, lengthening or otherwise interfering with the normal operating cycle of the machine, and particularly the plasticizing and melt-injection phase of that cycle.

In the event a new billet is not delivered to the plasticizing section of the molding machine, when required, as upon a malfunction of the magazine-indexing mechanism 82, or when the supply of billets in magazine 54 is exhausted, it is desirable that the machine operation be stopped. However, to prevent formation of a defective product in the mold, and possible damage to the machine, shutdown should preferably not occur during either the plasticizing, mold-injection or curing phase of machine operation.

To this end, means are provided in the machine of this invention to certify the delivery of a new billet and, upon the failure thereof, to provide an appropriate indication. As herein shown, a photocell, schematically indicated at 93, is normally illuminated by a light source 94. Photocell 93 and light source 94 are arranged adjacent the lower end of billet guide 85 so that the passage of a billet from guide 85 into housing 56 momentarily interrupts the light beam from photocell 93, thereby to produce an electrical signal on a line 95.

That signal is applied along with a signal from circuit 70 to a billet-feed-certifying circuit at 96. In the event that circuit 96 receives a signal from circuit 70 indicating that plunger 60 is retracted, and within a predetermined time thereafter does not receive a signal from photocell 93 indicating the delivery of a new billet, circuit 96 produces a signal at its output indicating a billet-delivery failure.

The latter signal is applied to the input of a cycle control override circuit 98 which also receives input signals from switch 50 and mold interlock 35. When the latter two signals indicate that motor 18 is de-energized and the mold is open, and when an appropriate signal is obtained from circuit 96, circuit 98 then produces an override signal at its output, which in turn is applied to cycle control 30, thereby to cause the machine to shut down.

Magazine 54 as herein shown may comprise a pair of spaced circular plates 106 and 108. A plurality of billet-containing tubes 110 are arranged in two concentric rings between plates 106-108 and are fixedly secured to the plates in any suitable manner to prevent movement of the tubes relative to the plates. Each of plates 106–108 is provided with apertures 109 formed in two correspondingly concentric rings 112 and 114. The opposite ends of the tubes 110 are in communication with respectively aligned pairs of apertures in plates 106-108. As seen in FIG. 3, the apertures 109 formed in the inner ring are staggered with respect to those in the outer ring, as are tubes 110 respectively positioned in communication with those apertures.

Magazine 54 is mounted on a shaft 115 for incremental rotation with respect to a fixed plate 116 secured to billet housing 56 by means of a mounting bracket 118 (FIG. 2). A radial slot 120 is formed in plate 116 and communicates with the upper end of the billet guide 85 which may be secured to plate 116 in any appropriate manner. The radial dimension of slot 120 is sufficiently large to encompass the inner and outer rings 112–114 of apertures 109 in plate 106.

When magazine 54 is caused to rotate with respect to plate 116 by means of indexing mechanism 82, one of the apertures 109 in plate 106 and tube 110 having an end in communication with that aperture are brought into communication with slot 120. The billet contained in that tube falls through slot 120 and guide 85 into housing 56. For subsequent indexing operations of magazine 54, different billet-containing tubes 110 are brought into registration with slot 120 so that a billet from a tube 110 in one ring will be delivered into housing 56 in one billet-feeding operation, followed by the delivery of another billet from a tube arranged in the other ring in the succeeding billet-feeding operation. When the supply of billets in tubes 110 is exhausted, a new magazine may be substituted, or a new supply of billets may be fed manually or automatically into tubes 110 through the apertures in rear plate 108.

In the embodiment of the invention herein shown, indexing mechanism 82 comprises an arm 122 to which one end of cable 81 is connected by a clamp 124, the other end of cable 81 being secured as described above to one end of pivotable arm 78. Arm 122 is connected to a ratchet wrench 126 secured to shaft 115 which in turn passes through a central opening formed in plate 116. The free end of arm 122 is connected to plate 116 by means of a tension spring 128, the lower end of which is fixed to a bracket 130 secured to plate 116. Spring 128 biases arm 122 in a stationary position and, upon the engagement of arm 78 by the upwardly-moving plunger 60, arm 78, acting through cable 81, causes arm 122 to move against the force of spring 128 to cause a single indexing operation of ratchet mechanism 126, thereby causing the desired incremental rotational movement of magazine 54, to bring a new billet into registration with slot 120 and thus into housing 56. When plunger rod 60 no longer engages arm 78, arm 122 is pivoted back to its normal position by spring 128 where it remains until the arm is once again engaged and pivoted by plunger 60 during its subsequent upward movement toward its retracted position.

The apparatus of the present invention successfully achieves its desired results of automatically supplying premixed plastic billets into the injection-molding machine while at the same time ensuring that there is always a sufficient amount of such material in engagement with the plasticizing section for the formation of an adequate supply of melt.

The delivery of a new billet (upon the sensing of a minimum remaining amount of material) is accomplished in synchronization with the normal operating cycle of the molding machine in a manner that ensures no impairment, lengthening or interference with either the plasticizing or mold-injection phases of that cycle. Moreover, the invention provides means for detecting a failure to deliver a new billet when required, and to shut down the machine at that time. Such shutdown, however, cannot occur during either the plasticizing or mold-injection phase of machine operation.

The billet-feeding apparatus may be provided separately of the plastics molding machine, in which case it may be readily adapted for use with such machine as by securing the billet housing 56 into communication with the plasticizing section of the machine, or the billet-feeding apparatus may be produced in combination with the plastics injection-molding machine if desired. To increase the capacity of the molding machine, a number of billet-feeding apparatus of the type described may be arranged radially about the plasticizing screw of the machine, thereby to simultaneously urge several billets into engagement with the plasticizing screw. Moreover, to adapt the billet-feeding apparatus for different minimum remaining amounts of billet material, the relative vertical position of microswitch 66 may be adjusted.

Thus, while the present invention has been described in detail for only a single preferred embodiment thereof, it will be appreciated that modifications and variations may be made therein, such as the use of gravity-operated linear chutes instead of the reel-type magazines herein particularly described, and that such modifications will all be within the spirit and scope of the present invention as described in the appended claims.

I claim:

1. A plastics injection-molding machine comprising plasticizing means for the accumulation of a plasticized melt, a cavity mold, and means effective to periodically discharge a predetermined quantity of said melt into said mold, means for periodically feeding to said plasticizing means substantially uniform plastic articles from which said melt is to be formed, means for sensing the presence of a predetermined minimum unplasticized amount of the material of said articles in operative engagement with said plasticizing means, and means including means responsive to said sensing means for introducing a succeeding one of said articles into position for operative association with said plasticizing means upon the sensing of said minimum amount, said feeding means comprises a plunger movable between a first operative position in which it operatively engages and urges one of said articles into engagement with said plasticizing means, and a second operative position in which it is remote from said article, said sensing means being effective upon the sensing of a minimum amount of said article to move said plunger from its said first position to its said second position.

2. The machine of claim 1, further comprising second sensing means effective to sense when said plunger is at its said second operative position, and means responsive to said second sensing means and effective to return said plunger to its said first operative position after the introduction of said second one of said articles.

3. The machine of claim 2, in which said first-mentioned sensing means comprises means effective to determine a relative lowermost position of said plunger with respect to a reference position.

4. The machine of claim 3, in which said first-mentioned sensing means comprises first means arranged along the path of movement of said plunger, and operatively engaged by said plunger when the latter is at said lowermost position, said second sensing means comprising second means spaced above said first means in the direction of travel of said plunger, and operatively engaged by said plunger when the latter is at its second operative position.

5. The machine of claim 4, in which said article-introducing means comprises feed means having one end in communication with said plasticizing means, and means for periodically positioning one of said articles at the other end thereof.

6. The machine of claim 5, in which said article-introducing means comprises first and second apertured members, said positioning means comprising means for selectively causing apertures in said first and second members to be in substantial registration with one another and with said other end of said feed means.

7. The machine of claim 6, in which said first member comprises a single aperture in communication with said feed means, said second member comprising a plurality of apertures formed about the periphery thereof, said positioning means comprising means for selectively bringing one of said plurality of apertures in said second member into registration with said single aperture in said first member.

8. The machine of claim 6, further comprising a plurality of open-ended container means carried by said second member for holding individual ones of said articles, the apertures in said second member being in respective registration with one end of said container means.

9. The machine of claim 8, in which there are radially spaced first and second concentric rows of apertures in said second member, said single aperture in said first member being radially dimensioned to overlie both of said rows, said positioning means comprising means for selectively and incrementally moving apertures in one and then the other of said first and second rows of apertures into registration with said single aperture.

10. The machine of claim 9, in which said apertures in said second member are arranged in first and second radially spaced, staggered concentric rings, alternating apertures in said first and second rings being in respective registration with said single aperture for each incremental position of said article-feeding means.

11. The machine of claim 1, in which said sensing means comprises means effective to determine the relative position of said plunger with respect to a reference position.

12. A plastics injection-molding machine comprising plasticizing means for the accumulation of a plasticized melt, a cavity mold, and means effective to periodically discharge a predetermined quantity of said melt into said mold, means for periodically feeding to said plasticizing means substantially uniform plastic articles from which said melt is to be formed, means for sensing the presence of a predetermined minimum unplasticized amount of the material of said articles in operative engagement with said plasticizing means, and means including means responsive to said sensing means for introducing a succeeding one of said articles into position for operative association with said plasticizing means upon the sensing of said minimum amount, said article-introducing means comprises feed means having one end in communication with said plasticizing means, and means for periodically positioning one of said articles at the other end thereof.

13. The machine of claim 12, in which said article-introducing means comprises first and second apertured members, said positioning means comprising means for selectively causing apertures in said first and second members to be in substantial registration with one another and with said other end of said feed means.

14. The machine of claim 13, in which said first member comprises a single aperture in communication with said feed means, said second member comprising a plurality of apertures formed about the periphery thereof, said positioning means comprising means for selectively bringing one of said plurality of apertures in said second member into registration with said single aperture.

15. The machine of claim 14, further comprising a plurality of open-ended containing means carried by said second member for holding individual ones of said articles, the apertures in said second member being in respective registration with one end of said containing means.

16. A plastics injection-molding machine comprising plasticizing means for the accumulation of a plasticized melt, a cavity mold, and means effective to periodically discharge a predetermined quantity of said melt into said mold, means for periodically feeding to said plasticizing means substantially uniform plastic articles from which said melt is to be formed, means for sensing the presence of a predetermined minimum unplasticized amount of the material of said articles in operative engagement with said plasticizing means, and means including means responsive to said sensing means for introducing a succeeding one of said articles into position for operative association with said plasticizing means upon the sensing of said minimum amount, said article-introducing means further comprises means responsive to the operative state of said plasticizing means, means for detecting a failure to introduce one of said articles upon the sensing of said minimum amount, and means including means responsive to said failure-detecting means for terminating the operation of the machine.

17. The machine of claim 16, in which said machine-terminating means further comprises means responsive to the operative state of said plasticizing means, and means responsive to the condition of said mold.

18. A plastics injection-molding machine, comprising an elongated cylinder with an injection nozzle at the forward end, a plasticizing screw revolvably carried in said cylinder, intermittently operable billet-feed mechanism operative to discharge successive plastic billets into operative relation with a rearwardly located part of said screw, hydraulic means selectively operative to impart a forward reciprocation stroke to said screw for discharging a shot of plastics melt through said nozzle, motor means operative to rotate said screw to generate a fresh charge of melt forward of said screw as the accumulating melt forces retreat of said screw against back pressure from said hydraulic means, means sensing consumption of billet material to a predetermined extent permitting at least one further shot injection, and synchronizing means responsive to said last-defined means and interlacing a cycle of said billet-feed mechanism with the forward-reciprocation and melt-generating phases of said machine, whereby injection and melt-generation phases of the machine will be unaffected by billet-feeding operations.

* * * * *